United States Patent
Romanik et al.

(10) Patent No.: US 7,565,441 B2
(45) Date of Patent: Jul. 21, 2009

(54) IMAGE TRANSFER AND ARCHIVAL SYSTEM (76) Inventors: Philip B. Romanik, 116 Parker Ave. East, West Haven, CT (US) 06516; Amy H. Muntz, 71 Grassland St., Lexington, MA (US) 02421

( * ) Notice: Subject to any disclaimer, the term of this patent is extended or adjusted under 35 U.S.C. 154(b) by 1344 days.

(21) Appl. No.: 09/911,090

(22) Filed: Jul. 23, 2001

(65) Prior Publication Data
US 2003/0018802 A1 Jan. 23, 2003

(51) Int. Cl.
G06F 15/16 (2006.01)
G06K 9/36 (2006.01)
G06K 9/46 (2006.01)

(52) U.S. Cl. ............... 709/234; 709/203; 709/219; 382/232

(58) Field of Classification Search ........... 709/203, 709/219, 234; 382/232
See application file for complete search history.

(56) References Cited

U.S. PATENT DOCUMENTS

| | | | | |
|---|---|---|---|---|
| 5,179,651 A * | 1/1993 | Taaffe et al. | ............. | 345/555 |
| 5,187,750 A * | 2/1993 | Behera | ............. | 382/140 |
| 5,359,512 A * | 10/1994 | Nishihara | ............. | 382/128 |
| 5,706,457 A * | 1/1998 | Dwyer et al. | ............. | 715/835 |
| 5,845,018 A * | 12/1998 | Breish | ............. | 382/276 |
| 5,881,269 A * | 3/1999 | Dobbelstein | ............. | 703/21 |
| 6,111,591 A * | 8/2000 | Ohtake et al. | ............. | 345/531 |
| 6,246,797 B1 * | 6/2001 | Castor et al. | ............. | 382/232 |
| 6,298,173 B1 * | 10/2001 | Lopresti | ............. | 382/305 |
| 6,300,959 B1 * | 10/2001 | Gabler et al. | ............. | 345/473 |
| 6,332,193 B1 * | 12/2001 | Glass et al. | ............. | 713/170 |
| 6,388,687 B1 * | 5/2002 | Brackett et al. | ............. | 715/810 |
| 6,427,152 B1 * | 7/2002 | Mummert et al. | ............. | 707/102 |
| 6,519,632 B1 * | 2/2003 | Brackett et al. | ............. | 709/219 |
| 6,564,225 B1 * | 5/2003 | Brogliatti et al. | ............. | 707/104.1 |
| 6,564,256 B1 * | 5/2003 | Tanaka | ............. | 709/219 |
| 2007/0300270 A1 * | 12/2007 | Benjamin et al. | ............. | 725/91 |

* cited by examiner

Primary Examiner—Ario Etienne
Assistant Examiner—Avi Gold (57) ABSTRACT

A system for preparing and transmitting all desired images from one or more image-producing clients to a server for archiving or later analysis, validation, or reporting purposes. Images are queued on the client while they await transmission to the server and can also be reduced in size, if necessary, to reduce storage space or network transmission time. Once the images reside on the server, they can be added to an image database or used for further processing.

16 Claims, 4 Drawing Sheets

IMAGE TRANSFER AND ARCHIVAL SYSTEM

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Many devices, including image analysis and surveillance equipment, use digital images. These images typically have a very short lifetime and are discarded once the useful information is extracted. However, many of these digital images are still useful for subsequent manual or automated analysis. But because of the large amounts of storage space required to save this information, existing systems often discard or overwrite this information. Examples of such systems include machine vision systems and medical imaging systems.

Figure 1:
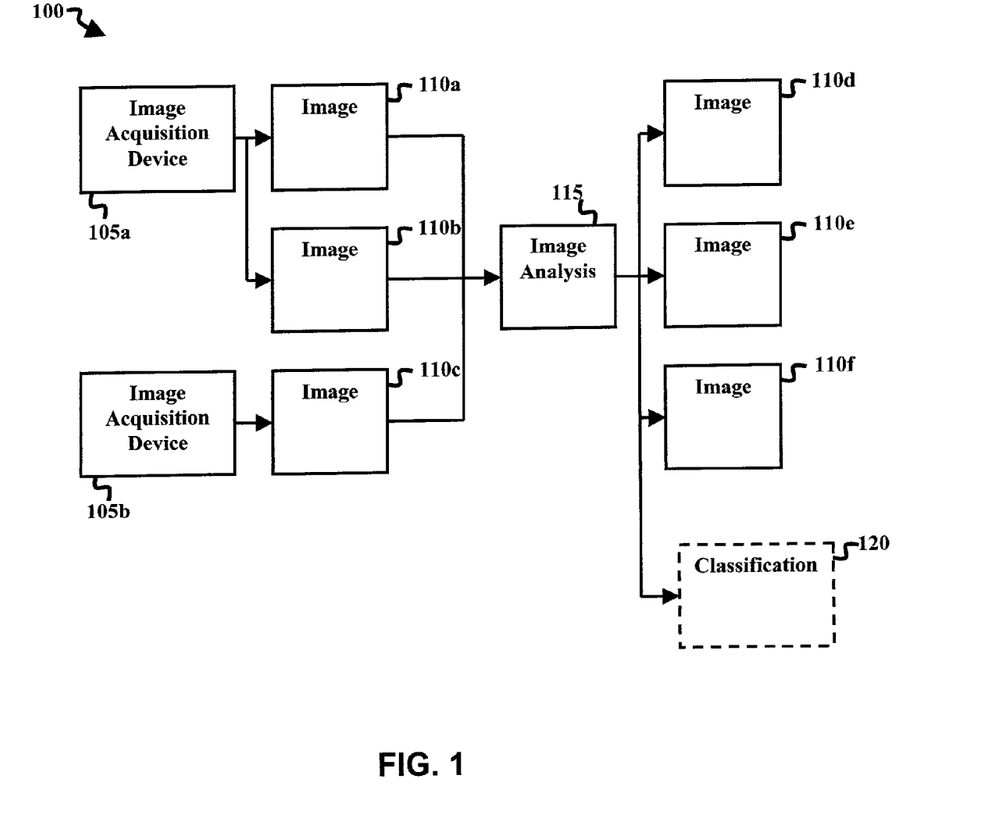
FIG. 1 is a block diagram illustrating a typical image analysis system, highlighting where digital images are produced.

FIG. 1 is a block diagram illustrating a typical image analysis system 100. The system 100 includes one or more image acquisition devices (each typically implemented with a video camera) shown as image acquisition devices 105a and 105b. Each image acquisition device produces one or more digital images, shown as 110a, 110b, and 110c. In this case, image acquisition device 105a produces images 110a and 110b, and image acquisition device 105b produces image 110c. The size, pixel depth and other attributes of every image need not be identical. System 100 also includes image analysis block 115 to perform image processing and analysis on images 110a, 110b, and 110c. The details and type of image processing and analysis depends upon the nature of the image analysis system. System 100 can also include a classification step, 120, to produce one or more parameters to describe the images that were analyzed. Image analysis 115 can also produce zero or more additional images as a by-product, in this example images 110d, 110e, and 110f.

As the cost of digital storage (for example, optical and magnetic) has decreased, the prevalence and speed of digital networks has inversely increased. This development now makes the archiving, post-analysis and reporting of image data technically feasible. For example, in U.S. Pat. No. 5,864,984 entitled "System and method for measuring seedlot vigor", growth measurements are extracted from a digital image and the image is then discarded. However, these discarded images contain a useful record of the experiment itself and discarding the images may result in a permanent loss of valuable information. One use of these images is to improve the existing analysis method by retaining the images in a lossless fashion, such that an image database containing these images can be used for subsequent analysis.

Image databases are frequently used to develop, enhance, and validate image analysis systems. The creation of an image database is often accomplished by capturing a sequence of images and then classifying each image. This classification reduces an image to a number of parameters used to describe the image. One of the inherent problems when creating an image database is the amount of time required to store each image in the database. For processes that produce images very quickly, there is often insufficient time to store an image before the next image is produced. One method is to selectively drop images thereby not storing every image in the database. An alternative method is to reduce the speed at which images are acquired, thereby allowing the image database to store all of the images. For example, in a machine vision application where a video camera is used to acquire images of manufactured widgets, the speed at which widgets are manufactured can be reduced such that a complete image database can be created. If methods like these are not employed, there can be insufficient time to both analyze and store the image.

Another method that can be used to create an image database is to capture and record the video stream directly from the device that produces the image (typically a CCD camera) or from the one or more image analysis devices. One common storage device is videotape since it can easily store an analog copy of a digital video stream. The problem is that the original digital video stream is degraded by storing it as an analog copy. This means that the stored images are really only suitable as a human visual record, as the images have been degraded to a point such that they are no longer useful for analysis. Saving all digital images, or selectively saving those images considered interesting, has a plurality of uses. By saving the digital video stream in an un-compromised manner, each image can be stored to provide a visual record of events that can be used subsequently to validate or enhance the analysis.

For performance reasons, image databases are best stored on the same machine where the images are acquired. But this also limits their usefulness because accessing these images can be difficult or slow, and simultaneously slow down the image acquisition system sharing the machine. Storing digital images on a separate machine allows the images from multiple image analysis devices to be combined, further enhancing their usefulness. Storing these images on a remote image database, however, is dependent upon the uptime of its network. Network outages or network traffic can render this method useless since these problems cannot be predicted in advance. Existing systems are further limited because they do not offer a means to dynamically adjust the transmission and archival of images as the network or other resources degrade.

BRIEF SUMMARY OF THE INVENTION

It is therefore an object of the present invention to provide techniques for transmitting and storing digital images such that they can be used for later analysis, validation, or reporting purposes.

In one aspect of the invention, digital images are transmitted from their source to a machine to be stored. This machine can be the source machine itself or it can be a separate remote machine. The image can also pass through intermediate machines to alleviate network and database congestion. The source (or client) machine attempts to transmit its image data to the storage (or server) machine. The client uses a number of rules to try and complete this transfer. In the case of network traffic, or if an abundance of information must be transmitted, some images may need to be modified. An image buffer, either in system memory or mass storage, is maintained while images wait to be transmitted. Rules are used in descending order of user selectivity that first include those that maintain the quality of the image, via lossless compression or windowing, followed by methods that cause information to be lost. A list of any changes made to the original image is attached to the image transmitted to the server.

Figure 2:
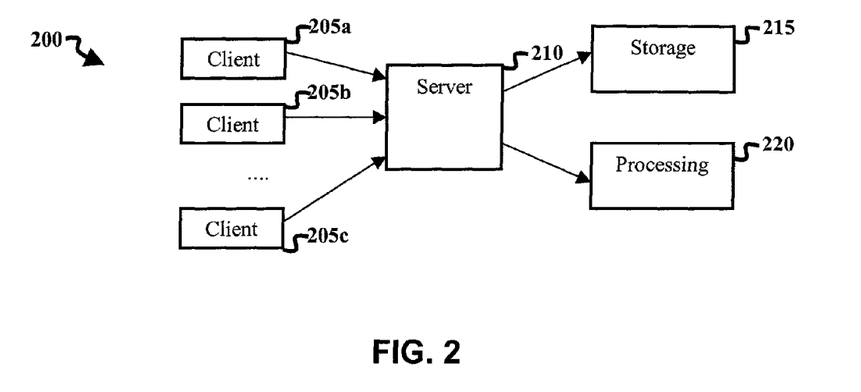
FIG. 2 is a block diagram illustrating a system according to the invention for transmitting digital images from a client machine to a server machine for archiving and further analysis or display.

FIG. 2 is a block diagram illustrating a typical client-server system 200. A multiplicity of clients (each typically implemented using a digital computer), e.g. client's 205a, 205b, and 205c, referred to collectively as clients 205 each produce one or more digital images as part of their image analysis system. These images are sent to the server 210 via a local area network or via any form of inter-process communication in the case where client 205 and server 210 exist on the same hardware. Server 210 is responsible for saving the images in storage 215, typically implemented as an image database or for further processing 220. The image database can be any form of storage, from a simple file system to a full relational database.

In another aspect of the invention, these rules are also applicable on the server machine while images are waiting to be stored. The rules are necessary in case access to the database is temporarily lost or an abundance of images are sent by the client machines such that the server cannot handle the load. Although most of the client rules apply, their order of importance or other parameters may be different. A list of any changes made to the image is attached to the image stored in the database.

In still another aspect of the invention, images produced by one or more clients are synchronized to aid in later retrieval and analysis. Synchronization typically includes a timestamp with sufficient resolution to identify when the image was produced. This information is attached to the image so that when the image is transmitted to the server, this information uniquely identifies the image.

In still another aspect of the invention, the network bandwidth, if any, which connects the image source machine and the image storage machine, can be divided into multiple pieces. Each piece is assigned a certain amount of bandwidth such that a given client machine providing the images will be guaranteed a particular quality of service. A single client machine can further divide this bandwidth as needed; for example, to reserve bandwidth for a particular type of image. Reserving resources for certain machines or types of images frees the client from examining network activity to decide how much bandwidth is available. The remaining, unallocated bandwidth is used as needed by other clients that do not have any allocated bandwidth.

In another aspect of the invention, the image storing server can act as a client in that it can also deliver digital images to other clients for analysis or display. The images will be returned, in as close a manner as possible, to the same state as when they were originally created. The images stored in the database contain information regarding all processing performed by the client or server machine during transfer. Image access can be random or sequential, including the ability to playback images in the same timeframe as they were created.

DETAILED DESCRIPTION OF THE INVENTION

The various features of the invention will now be described with respect to the figures, in which like parts are identified with the same reference characters.

Figure 3:
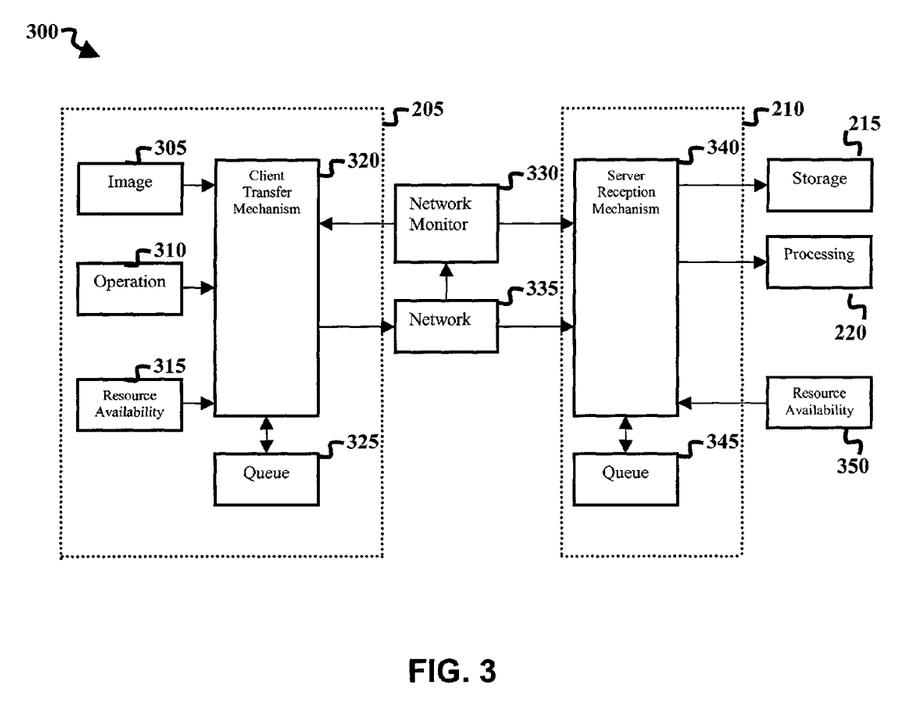
FIG. 3 is a block diagram illustrating a system according to the invention for transmitting digital images from a client machine to a server machine for archiving and other analysis or display.

FIG. 3 is a block diagram illustrating a system 300 according to the invention for transferring image signals from local client machines to a remote server machine. System 300 contains a client machine 205 (which corresponds to the client 205 identified in FIG. 2) that transmits images to server machine 210 (which corresponds to the server 210 identified in FIG. 2). Client 205 is typically implemented using a digital computer and includes a means of producing a digital image 305. In the preferred embodiment of the invention, each client can produce one or more images. These images are typically produced by an image acquisition device 105 or from one or more image processing steps applied by the image analysis system 115. The client transfer mechanism 320 is responsible for transmitting the image from the client 205 to the server 210. It accepts the image 305 along with an operation 310 to specify additional attributes. These attributes can include, but are not limited to, specifying what forms of processing the client transfer mechanism 320 can apply to the image, if needed, as well as time constraints that must be enforced. For real-time and other high-performance applications, the client transfer mechanism must be concerned with transferring the image 305 to the server 210 within the resource constraints of the system. The client transfer mechanism 320 also monitors the resource availability 315 of the client system. In the preferred embodiment of the invention this includes resources such as memory utilization, available mass storage space, processor load, and i/o activity. Resource availability 315 is a combination of current resource information as well as historical information and trends. The client transfer mechanism 320 uses this information to decide the amount of resources available to manipulate the image prior to transmission. Resource availability 315 also includes information regarding the availability of image analysis specific resources such as frame buffers and image buffers.

The client transfer mechanism 320 transmits the image 305 to the server 210 via a network 335. The network is typically a local area network connecting many machines together but can also be a dedicated connection between the client 205 and server 210. In the case where the client 205 and server 210 exist on the same piece of hardware, the network is interpreted as being some other path between these elements such as shared memory, pipes, or other forms of inter-process communications. A network monitor 330 monitors the conditions of the network 335 for the client 205 and server 210. The network monitor 330 is similar to the resource availability 315 in that it monitors current performance and also maintains historical information and trends. The client transfer mechanism 320 uses information from the network monitor 330 to gauge the availability and quality of network bandwidth. If sufficient network bandwidth exists, image 305 can be transferred to the server 210 immediately when image 305 is available. Wherever possible, the original image in its entirety is transmitted to the server 210. Maintaining the size, quality, and all other aspects of the image is necessary to make maximum use of the image once it is copied to server 210.

The client transfer mechanism also includes a queue 325 to hold images prior to transmission to the server 210. There are many conditions under which image 305 must be put into queue 325 before it can be sent to server 210. One reason is that there is insufficient resources, using information from resource availability 315, to accomplish the transfer in a timely fashion. This can arise when too many images need to be transferred to server 210 or most of the resources of the image analysis system 100 are being used for other purposes. Another reason for needing queue 325 is based upon the unavailability of network 335. Network congestion and uptime is a very dynamic process. Network monitor 330 can signal problems to the client transfer mechanism 320 causing image 305 to be moved to queue 325 rather than attempting to transmit the image immediately to server 210. In the preferred embodiment of the invention, image 305 is always placed in queue 325 prior to transmission to server 210. Copying the image 305 into the queue allows any resources used by image 305 to be freed for use by the image analysis system 100. The queue is controlled by the client transfer mechanism 320 so this also has the added benefit of transferring the control of image 305 from the image analysis system 100 to the client transfer mechanism 320. Queue 325 is not necessarily a rigidly sized image queue. If possible, the client transfer mechanism can resize or relocate the queue to prevent an overflow condition. In the preferred embodiment of the invention, the queue resides in system memory for maximum effectiveness and is increased in size, as necessary, to save additional images, until the maximum queue size (a parameter defined by the client transfer mechanism 320) is reached. However, the queue can be saved on a mass storage device as well or be split between system memory and mass storage. Maintaining the queue on anything other than fast system memory has an associated cost because it requires other system resources and processor time to affect the transfer of image 305 to the queue 325.

Server 210 receives image 305 via network 335. The architecture of server 210 is very similar to client 205 in that it contains a server reception mechanism 340 and queue 345. The server reception mechanism 340 is responsible for receiving images from network 335 and making them available to storage 215 or processing 220. In the preferred embodiment of the invention, images received by the server reception mechanism 340 are saved to storage 215 as part of an image database, although immediate processing of these images can also be done via processing 220. Storage 215 can be any type of storage device including system memory, mass storage, or other offline storage methods. The image database itself can range from a simple file system to a complete relational database, although any method of storing and retrieving images can be used. The processing block 220 is useful for any immediate processing that is necessary to the image, including but not limited to image display, thumbnail generation, statistical analysis, and classification. Storage 215 and processing 220 are not dependent on each other and either one or both of these blocks may exist in a system.

The server reception mechanism 340 monitors the resource availability 350 of the server system. In the preferred embodiment of the invention, this includes resources such as memory utilization, available mass storage space, processor load, and input/output activity. Resource availability 350 is a combination of current resource information as well as historical information and trends. The server reception mechanism 340 uses this information to decide the amount of resources available to manipulate the image when it is received.

A network monitor 330 monitors the conditions of the network 335 for the client 205 and server 210. The network monitor 330 is similar to the resource availability 350 in that it monitors current performance and also maintains historical information and trends. The server reception mechanism 340 uses information from the network monitor 330 to gauge the availability and quality of network bandwidth and to schedule and reserve resources it requires to store and process the image once it is received.

The server reception mechanism 340 also includes a queue 345 to hold images once they are received from the network 335. In the preferred embodiment of the invention, the image is stored in queue 345 while it is received from network 335. The size and layout of the queue 345 are dynamically adjustable, although a fixed size buffer can be used. The size of the queue depends upon a number of variables, including but not limited to, the number of client 205 machines, the ability of the client and network to transmit simultaneous images, the typical size of each image, the speed at which received images are handled by storage 215 and processing 220, and the availability of resources determined by resource availability 350.

The system 300 also includes the ability to dynamically alter the images, as necessary, to allow them to be transmitted from client 205 to server 210. Maintaining the image 305 in its original and unmodified form is always preferred, but numerous conditions can occur to prevent this. In one scenario, it is possible for the client 205 to produce a sequence of images faster than these images can be transmitted to server 210. If this condition lasts long enough, the queue 325 will not have sufficient capacity to store all of these images. In another scenario, resource availability 315 can indicate insufficient processor resources to store the images in queue 325. In yet another scenario, network congestion or other network disruption of network 335 can prevent images from being transferred to server 210 before queue 325 is exhausted. In still another scenario, the size of queue 325 can be undersized because of limited resources on the client 205. This can be especially true for embedded architectures that contain enough resources for the image analysis system 100 but little more. The client transfer mechanism 320 will first attempt to immediately transmit the image to the server 210. If this is not possible, the image 305 is added to queue 325. The queue 325 will grow, if configured to do so, to accommodate the image. If the queue cannot grow because it is at its maximum allowable size, the client transfer mechanism will attempt to reduce the size of one of more images to save space. There are two methods for reducing the space that an image consumes: lossless and lossy. A lossless reduction method minimizes the storage size of an image but without the loss of any pixel information, i.e.,. it is possible to reconstruct the original image such that it is suitable for subsequent image analysis. A lossy reduction method minimizes the storage size of the image at the expense of image information. Lossless reduction is preferred to lossy reduction, so that at some later point in time accurate image analysis can still be performed. Reducing the storage space of an image in the queue 325 can also be performed for other reasons. The act of transmitting an image from client 205 to server 210 via network 335 is often slow compared to the rate at which images are produced. To prevent the network 335 from becoming the bottleneck, a reduction in image storage size translates into a reduction in transmission time.

Reducing the storage size of image 305 or any image in queue 325 has an expense associated with it. One expense is the required processor resources necessary to affect the reduction. Another expense is the elapsed time necessary to reduce the image. The total expense of any image reduction must be measured to see whether the image reduction is possible given the current dynamics of the system.

Figure 4:
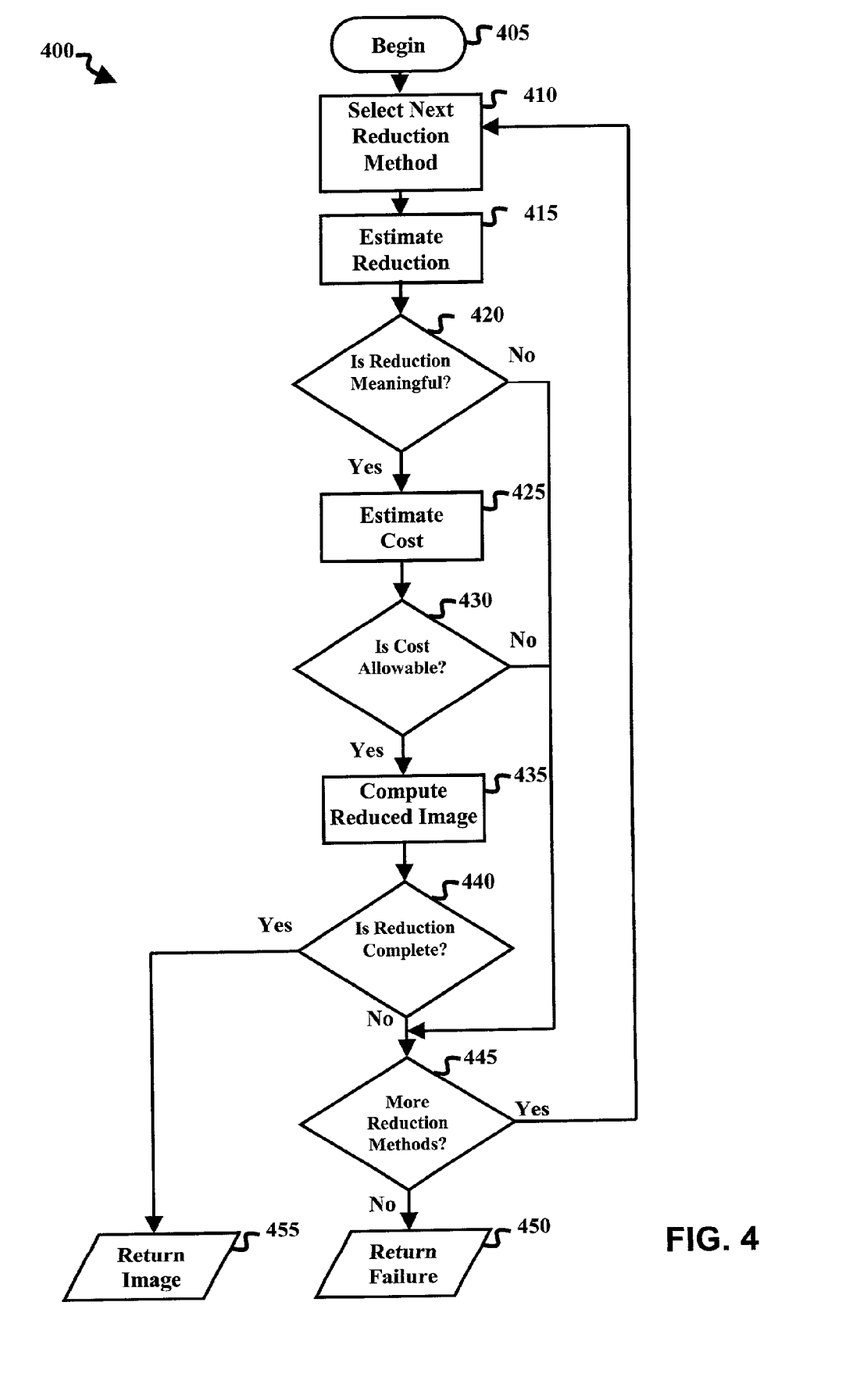
FIG. 4 is a flow chart illustrating a method according to the invention of deciding which image reduction method or methods should be used to reduce an image.

FIG. 4 is a flow chart illustrating a method 400 according to the invention for deciding which reduction method or methods should be employed to reduce an image. This process is performed inside the client transfer mechanism 320. The process of deciding which reduction method or methods is used begins in step 405. Typically, this will be initiated when an image 305 is added to the queue 325. It can also be initiated periodically as a background task or when resource or network problems are discovered.

In step 410, the next reduction method from a list of possible reduction methods is selected. Typically, this list is ordered starting with lossless compression methods followed by lossy compression methods and is further ordered by the expected efficiency of each reduction method. This list can also be dynamically modified given the results of previous passes through method 400.

In step 415, the expected amount of reduction is estimated. The goal of this estimate is to provide an approximation of how much reduction is possible with a particular method. Typically, this estimate is computed by observing the size, pixel depth and complexity of an image and only uses simple tests to determine the possible reduction.

In step 420, the estimated reduction savings is compared against a threshold. A reduction method, which produces savings less than the threshold, is thrown out so that other reduction methods can be considered. Reduction methods, which produce a sufficient amount of reduction, are further considered. Typically, the threshold is computed as a percentage of the original image size, although any fixed threshold or other method can be used.

In step 425, the cost or expense of the image reduction method is computed. The cost is typically computed by determining the amount of processor resources needed to reduce the image and the elapsed time needed to make the reduction. The cost is typically a single numerical quantity that makes comparison easy, but this is not a requirement. This cost information may also be used to reorder the reduction methods to optimize the reduction process.

In step 430, the computed cost is compared against a threshold. For most reduction methods, the decision is simply based on if the computed cost is less than the threshold value. For other reduction methods, the decision is based upon the threshold value and by examining the cost of other reduction methods. This is straightforward since the order in which reduction methods are evaluated are in the expected order of cost, from least to most. The threshold is typically computed based upon current resource availability and network activity. If the cost of computing a reduced image is too much, the reduction method is thrown out so that other reduction methods can be considered.

In step 435, a reduced image is computed from the current image. Depending upon the architecture of the image analysis system, this reduction can take place in the foreground (i.e. other operations are blocked until the image reduction is complete) or in the background (i.e. the reduction is carried out using only spare processor time). When the image reduction is completed, the new image replaces the original one, and information regarding the type of reduction is added as an annotation to the image. The actual cost and image reduction achieved can be used to improve the estimations used in step 415 and 425.

In step 440, the storage size of the reduced image is compared verses the desired size. If the image is less than the desired size, or within a small percentage of this value, the reduction process is finished and the process continues to step 455. Under many circumstances the reduction only requires a single step. However, there are some cases where multiple reduction steps are necessary in order to reduce the image to the desired size.

In step 445, the system determines if any more reduction methods are available to be applied. This step is run after any processing from the previous reduction method is complete. If more reduction methods are available, the system continues with step 410 and selects the next method from the list.

If no more reduction methods exist and the image has not been reduced to the desired size, step 450 is run. This signals the end of method 400 and tells the client transfer mechanism that the reduction was not possible. If the reduction applied in step 435 successfully reduced the image to the desired size, step 455 is run and signals the end of method 400, returning the newly reduced image to the client transfer mechanism 320.

The list of available image reduction methods is limitless. However, for any given image analysis system, a small list of possible image reduction methods can typically be selected. The first image reduction methods to consider are lossless methods. These methods include but are not limited to Region Of Interest (ROI) windowing and lossless compression. ROI windowing refers to eliminating pixels in the image which are not needed for the image analysis and do not contain any useful information that future queries would need to obtain. The original image is converted into one of more windows, typically rectangular, to specify the useful pixels in the image. In the simplest case, a single window is applied to contain only useful image data, thus eliminating border pixels. The image can also be divided into multiple windows to specify those regions that contain desired information. Information regarding each ROI window is maintained so that a single, composite image representing the original image can be reconstructed upon demand. Each ROI window is specified as an origin point with additional information regarding the extent and shape of the window. In the case of a rectangular window, the origin point and width and height of the window will fully specify the size and location of the window. The image that is transmitted from the client 205 to server 210 is thus an array of smaller images including information on how those pieces can be reassembled. The pixel information that was removed can be replaced with a background pixel whose value is application dependent. Another lossless reduction method is to employ one of many lossless image compression methods. For example, if the image is an 8-bit image that contains only 256 colors or levels of gray, the well-documented GIF encoding can be employed. Image compression algorithms such as these work best on images with repeating pixel values.

There are also numerous lossy image reduction methods available. Since these methods will remove some amount of information from the original image, their use makes it more difficult and less accurate to use these images in later image analysis. However, having an image with some image information missing is still preferred to having no image available at all. And even if image analysis cannot be performed on these images, they are still useful as a visual record. These methods include but are not limited to pixel depth reduction, lossy image compression, and image scaling. Pixel depth reduction reduces the size of each pixel while keeping the actual size of the image unchanged. This can dramatically degrade the information contained in relatively low pixel depth images (such as 8-bit pixels) but has much less of an effect with larger pixel depth images (such as 16-bit or larger). For example, a large 16-bit pixel depth image can be quickly converted into an 8-bit or 12-bit pixel depth image. And because there is still quite a bit of pixel information available, some image analysis routines can typically still be performed. One variation of this image reduction method is to reduce a color image into a lower-resolution color image or a gray-scale image. For example, a 24 bit RGB image (8-bits of information for each of the red, green, and blue channels) can be converted into a 16-bit image (5-bits of information for the red and blue channels and 6-bits of information for green). In addition, lossy image compression methods can be employed to reduce the actual size of the image. This step will most likely render machine analysis of the image impractical. One common lossy image compression method is JPEG compression. At the expense of image detail, and some amount of processor time, the image can be converted into a form that requires much less storage space as well as reducing the transfer time from client to server. Image scaling is yet another method that can reduce the storage size of an image. The overall size of the image is reduced to create a smaller image that requires less storage space. Although the size of the new image can be arbitrary, in the preferred embodiment of the invention, the new image is a factor of 2×, 4×, and so on smaller than the original image in both dimensions. Using these reduction methods, the size minimization is accomplished by sub-sampling or some form of pixel averaging.

The reduction method 400 does not always produce an image that can be inserted into queue 325. If this condition arises, some additional steps can be taken to permit images to be saved in queue 325 and eventually transmitted to server 210. One alternative is to review the other images saved in queue 325. Some of these images maybe reduced by using method 400 to save additional space in the queue. In the preferred embodiment of the invention, this process happens periodically to maximize the available space in the queue and to reduce the transfer time of the images to the server. But this periodic step will only attempt lossless compression methods. In the case where the images in the queue are reviewed because the queue is full, lossy compression methods are attempted as well. Also in the preferred embodiment of the invention is the notion that not all images are of equal importance. Classification information, if any, which is attached to an image can be reviewed to determine the importance of the image. This allows the images in the queue to be prioritized such that the most important images are left untouched, or modified only by lossless methods. This prioritization also allows, as a last resort, to delete the least important images in the queue. As another aspect of the preferred embodiment of the invention, if the queue is full of images of equal importance, images are deleted using a user-defined formula. Common choices include deleting the current image 305, deleting the oldest image in the queue, and deleting a sequence of images from the queue.

An image received over network 335 by server 210 is handled by the server reception mechanism 340. In the preferred embodiment of the invention, the server reception mechanism 340 allocates storage in its queue 345 to hold the image while it is received. Once the image is received, the image is made available to any further processing 220 or is written to storage 215 as part of the image database. In the preferred embodiment of the invention and on systems that support them, the network can also transfer the image directly to the file system using an arrangement such as a network file system (NFS). In this configuration, the image is written to a temporary file in the file system. When the image is received, the server reception mechanism 340 will copy this image to storage 215 or pass it to processing 220 for immediate use.

Under certain conditions, such as problems writing images to the image database or receiving a large number of simultaneous images from multiple clients, the queue 345 can fill up such that no space is available for new images. In a manner similar to queue 325 on the client-side, the server reception mechanism will attempt to increase the size of the queue to enable more images to be saved. If the queue cannot grow because it is at its maximum allowable size, the server reception mechanism 340 can attempt to reduce the size of one or more images to save space. There are two methods for reducing the space an image consumes: lossless and lossy. For images that were not reduced by the client transfer mechanism 320, the method 400 shown in FIG. 4 may be used by server reception mechanism 340 in an attempt to reduce the image size. .

The client 205 produces images 305 to be transferred to the server 210. The client can be configured to transfer all images or just a selection of images to the server. In the preferred embodiment of the invention, interesting images such as those depicting defects or other changes from the expected result are sent to the server, although any criteria can be used. System 300 uses a queue and image reduction mechanism to attempt and transmit all desired images to the server 210. Some images are more important or more desired than other images, and this system can prioritize and reduce the least important images first. In an alternate embodiment of the invention, the network 335 connecting the client 205 and server 210 can be divided into one or more pieces, each reserving a certain amount of network bandwidth. Each of these pieces can be assigned to one or more image classifications, guaranteeing sufficient bandwidth for the immediate or subsequent transfer to the server. With this technique, the need for queue 325 is much reduced, although not eliminated since network disruptions can still occur. In this embodiment of the invention the queue 325 can be implemented as a series of queues or as a single queue with reserved elements to accommodate the usual backlog of images as they await transmission via a reserved section of bandwidth. A mapping is created to convert the image classification to the appropriate network channel to use. Any classifications that are not configured to map to a reserved section of network bandwidth are mapped to the remaining, unreserved bandwidth.

Data passing between client 205 and server 210 via network 335 can optionally be encrypted to prevent eavesdropping or tampering of the image data. On networks that support encryption, such as the secure sockets layer (SSL), the network handles all encryption and the client must only initialize this feature when the client-server network connection is opened. In the preferred embodiment of the invention encryption is possible even when the network does not support it because the client transfer mechanism 320 can simply encrypt the data stream and the server reception mechanism 340 can decrypt the data stream. The choice of encryption depends upon the application's need for security and the time required to perform the encryption. In the preferred embodiment of the invention, the user can select no encryption, data encryption standard (DES), or Rot13 (a simple obfuscation method). Any encryption is applied after any image reduction and immediately before the image is transferred to the server. The decryption takes place automatically either when the server receives the data as in the case of Rot13 encryption, or after the server receives the data and the image is placed in queue 345.

Every image that is transferred from the client 205 to server 210 can be appended with a unique identifier which is globally unique among all clients and all images. This identifier serves to uniquely identify a specific image and also to synchronize images between multiple clients. This unique identifier is appended in addition to any identification information that might have been previously appended by the image analysis system. This unique identifier can be used as a primary key in an image database to reference an image. The synchronization methods allow the server to use this unique identifier to ascertain the source and time frame when the image was generated. In the preferred embodiment of the invention, the unique identifier has four components: client identifier, image source identifier, time identifier, and user specified identifier. The user-specified identifier is an optional piece of information supplied by the image analysis system to further identify the image. The client identifier is a field to uniquely identify a client. This can be generated in any fashion but using information derived from the network address or machine name of the client is preferred. The image identifier uniquely identifies the image source on a client. For clients that transmit images only from a single source, this identifier is a constant. The time identifier designates the time when the image is passed to the client transfer mechanism 320. The time field must be of sufficient resolution to prevent two images from having the same unique identifier. This time field is also synchronized among multiple clients so that images on the server received from a plurality of clients can be associated with each other. The time identifier must be synchronized between multiple clients to prevent ambiguity between images in the image database. The time identifier need not have any relationship with the current time of day, but in the preferred embodiment of the invention, the time identifier is the time of day as measured on the server. The server periodically transmits its current time of day to each client so that each client can synchronize its time identifier to this value.

Figure 5:
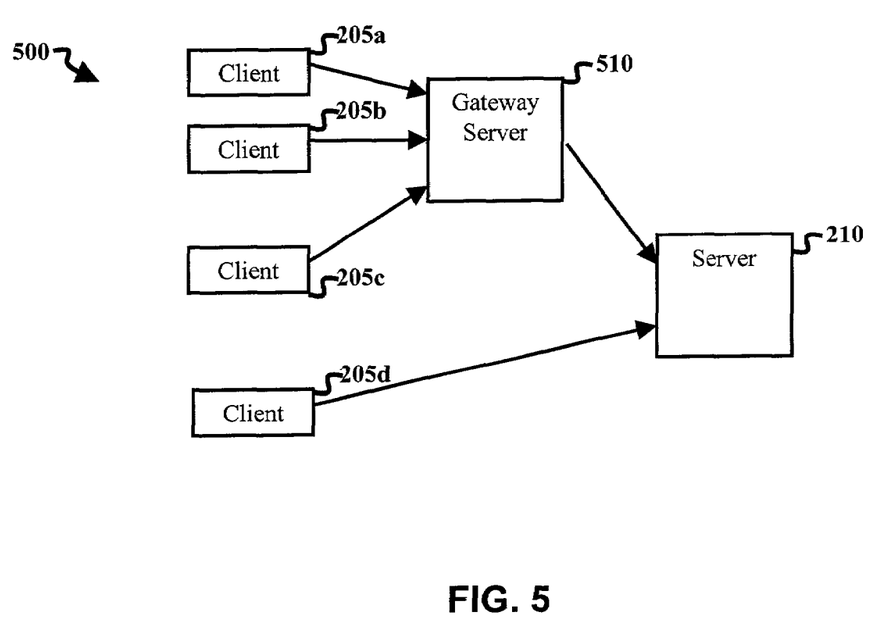
FIG. 5 is a block diagram illustrating a system according to the invention where an intermediate gateway server is used for load balancing between clients and the server.

FIG. 5 is a block diagram illustrating a system 500 that, according to the invention, includes one or more gateway servers to perform load balancing between the clients and server. Load balancing is the act of buffering images from some clients and retransmitting them to the server when possible. System 500 contains a multiplicity of clients (each typically implemented using a digital computer), e.g. clients 205a, 205b, 205c and 205d, referred to collectively as clients 205 each produce one or more digital images as part of their image analysis system. A gateway server 510 is employed to receive and buffer images from one or more client machines (clients 205a, 205b and 205c in this example). The images are retransmitted from the gateway server 510 to the server 210. The gateway server 510 closely resembles server 210 except that it is missing the server functionality of storage 215 and processing 220. However, as far as client 205 is concerned, gateway server 510 is a full-fledged server. And as far as server 210 is concerned, gateway server 510 is a full-fledged client. This property makes it an easy process to add gateway servers to an installation of multiple client machines. System 500 also shows client 205d connecting directly to server 210 to illustrate that some clients can use gateway servers while other clients can connect directly to server 210. In the preferred embodiment of the invention, most of the software used to implement the server 210 and gateway server 510 is identical, and when a server is created it is configured as being either a gateway server 510 or server 210.

Various embodiments of the invention have been described. The descriptions are intended to be illustrative, not limitative. Thus, it will be apparent to one skilled in the art that certain modifications may be made to the invention as described without departing from the scope of the claims set out below.

We claim:

1. A system for transmitting digital image signals from a client device to a server device, comprising:

means for establishing a connection between one or more client devices and server device;

means for optionally making a copy of an image to free up system resources on said client device;

means for measuring the availability of local client resources including available processor time and means for maintaining historical information and trends of client resources;

means for measuring the status and performance of the network connecting the client device and server device, and means for maintaining historical information and trends of the network;

means for transferring the image to a client queue wherein said availability means and said status means determine the image cannot be transmitted immediately to the server device;

means for increasing the size of said client queue if the client queue becomes full due to the accumulation of images in the queue;

means to dynamically reduce the size of the image in the client queue wherein said availability means and said status means are used to estimate the level of reduction necessary such that the reduced image can be transmitted from the client device to the server device before the client queue becomes full;

means for transferring the image from the client queue on the client device to the server device as a digital signal such that a permanent copy of the image is not maintained on the client device wherein said reduction means has reduced the size of the image sufficiently to prevent the client queue from becoming full;

means for persisting the image from said transfer means on the server device until it is processed or saved whereas the image may be of reduced resolution or quality.

2. A system according to claim 1, wherein the means for increasing the size of the client queue includes an upper limit to prevent the queue from growing beyond a specified size.

3. A system according to claim 1, wherein the means for transferring the signal from the client to the server can include encrypting the information on the client prior to transmission and decrypting the data once it is received by the server.

4. A system according to claim 1, wherein the means for transferring the image signal from the client to the server can comprise:

means for transmitting image data from one or more clients to a gateway server, such that the clients consider the gateway server to be a server;

means for buffering the image data on the gateway server;

means for transmitting image data from the gateway server to the server, such that the server considers the gateway server to be a client.

5. A system according to claim 1, wherein the means for reducing the size of an image comprises:

means for selecting one or more reduction methods to reduce the image size from a plurality of lossless or lossy compression methods;

means for reducing the current image, or reducing any image in the queue when the queue becomes full;

means for periodically reducing the size of the images in the queue, using reduction methods when processor resources are available.

6. A system according to claim 5, wherein the means for selecting one of more reduction methods comprises:

means for estimating the reduction in image size possible for a specific reduction method;

means for estimating the cost of this reduction where the cost includes the resources required for reduction as well as the time to reduce the image;

means for performing the reduction if the cost is allowable and the reduction is considered meaningful;

means for evaluating other reduction methods if the desired amount of reduction has not been achieved.

7. A system according to claim 6, wherein the means for determining if the cost is allowable comprises:

means for checking the current system resources to see if sufficient resources and time are available to reduce the image;

means for checking historical system resources and trends to estimate future resource availability;

means for checking the current network parameters such as available bandwidth and throughput;

means for checking historical network conditions and trends to estimate future network conditions.

8. A system according to claim 1, wherein the means for transferring the image signal from the client device to the server device comprises:

means for storing the received image in a server queue or on a networked file system;

means for increasing the size of the server queue if the server queue becomes full due to the accumulation of images in the queue;

means for dynamically reducing the size of images in the server queue to either conserve storage space in the server queue or to reduce storage requirements in the image database.

9. A system according to claim 8, wherein the means for increasing the size of the server queue includes an upper limit to prevent the queue from growing beyond a specified size.

10. A system according to claim 8, wherein the means for reducing the size of an image comprises:

means for selecting one or more reduction methods to reduce the image size from a plurality of lossless or lossy compression methods;

means for reducing the current image, or reducing any image in the queue when the queue nears or becomes full;

means for periodically reducing the size of the images in the queue, using lossless compression methods when processor resources are available.

11. A system according to claim 10, wherein the means for selecting one of more reduction methods comprises:

means for estimating the reduction in image size possible for a specific reduction method;

means for estimating the cost of this reduction where the cost includes the resources required for reduction as well as the time to reduce the image;

means for performing the reduction if the cost is allowable and the reduction is considered meaningful;

means for evaluating other reduction methods if the desired amount of reduction has not been achieved.

12. A method for transmitting volatile real-time digital image signals from a client device to a server device, comprising:

transferring a volatile image to a client queue if the image cannot be transmitted immediately to the server device;

increasing the size of the client queue if the client queue becomes full due to the accumulation of images in the queue;

dynamically reducing the size of the image in said client queue such that the estimated level of reduction is determined by examining the available processor time on the client device as well as examining the available network bandwidth between the client device and server device wherein the reduced image can be transmitted from the client device to the server device before the client queue becomes full;

transferring the volatile image from the client queue on the client device to the server device as a digital signal such that a permanent copy of the image is not maintained on the client device wherein said image reduction has reduced the size of the image sufficiently to prevent the client queue from becoming full;

persisting the image from said transfer on the server device until it is processed or saved whereas the image may be of reduced resolution or quality.

13. A method according to claim 12, wherein the step of increasing the size of the client queue includes an upper limit to prevent the queue from growing beyond a specified size.

14. A method according to claim 12, wherein the step of preventing images from being discarded by reducing the size of said images comprises:

selecting one or more reduction methods to reduce the image size from a plurality of lossless or lossy compression methods;

reducing the current image, or reducing any image in the queue when the queue becomes full;

periodically reducing the size of the images in the queue, using reduction methods when processor resources are available.

15. A method according to claim 14, wherein the step of selecting one of more reduction methods comprises:

estimating the reduction in image size possible for a specific reduction method;

estimating the cost of this reduction where the cost includes the resources required for reduction as well as the time to reduce the image;

performing the reduction if the cost is allowable and the reduction is considered meaningful;

evaluating other reduction methods if the desired amount of reduction has not been achieved.

16. A method according to claim 15, wherein the step of determining if the cost is allowable comprises:

checking the current system resources to see if sufficient resources and time are available to reduce the image;

checking historical system resources and trends to estimate future resource availability;

checking the current network parameters such as available bandwidth and throughput;

checking historical network conditions and trends to estimate future network conditions.

* * * * *